(12) United States Patent
Holzinger et al.

(10) Patent No.: US 12,012,941 B2
(45) Date of Patent: Jun. 18, 2024

(54) PLAIN BEARING ARRANGEMENT

(71) Applicant: Miba Gleitlager Austria GmbH, Laakirchen (AT)

(72) Inventors: Martin Holzinger, Scharnstein (AT); Albert Waldl, Laakirchen (AT); Johannes Hoelzl, Berg im Attergau (AT); Philipp Bergmann, Gmunden (AT)

(73) Assignee: Miba Gleitlager Austria GmbH, Laakirchen (AT)

( * ) Notice: Subject to any disclaimer, the term of this patent is extended or adjusted under 35 U.S.C. 154(b) by 116 days.

(21) Appl. No.: 17/435,201

(22) PCT Filed: Mar. 4, 2020

(86) PCT No.: PCT/AT2020/060064
§ 371 (c)(1),
(2) Date: Aug. 31, 2021

(87) PCT Pub. No.: WO2020/176919
PCT Pub. Date: Sep. 10, 2020

(65) Prior Publication Data
US 2022/0145862 A1    May 12, 2022

(30) Foreign Application Priority Data
Mar. 7, 2019 (AT) .............................. A 50183/2019

(51) Int. Cl.
*F03D 80/70* (2016.01)
*F03D 1/06* (2006.01)
(Continued)

(52) U.S. Cl.
CPC .......... *F03D 80/70* (2016.05); *F03D 1/0691* (2013.01); *F16C 17/035* (2013.01);
(Continued)

(58) Field of Classification Search
CPC ...... F03D 80/70; F16C 17/035; F16C 23/045; F16C 33/108; F16C 43/02; F16C 2226/76; F16C 2300/14; F16C 2360/31
See application file for complete search history.

(56) References Cited

U.S. PATENT DOCUMENTS 2,167,882 A * 8/1939 Fast ...................... F16C 17/035
29/898.1
2,276,143 A    3/1942 Bell
(Continued)

FOREIGN PATENT DOCUMENTS

AT    509 625 A1    10/2011
AT    519 288 B1    7/2018
(Continued)

OTHER PUBLICATIONS

International Search Report in PCT/AT2020/060063, mailed Jun. 18, 2020.
(Continued)

*Primary Examiner* — Christopher R Legendre
(74) *Attorney, Agent, or Firm* — Collard & Roe, P.C.

(57) ABSTRACT

A sliding bearing includes: an inner ring element; an outer ring element; and at least one sliding bearing element, which is arranged between the inner ring element and the outer ring element. The sliding bearing element has multiple sliding bearing pads, wherein the individual sliding bearing pads each have a bearing surface, which is designed in the shape of a spherical cap.

12 Claims, 5 Drawing Sheets

Figure 1:
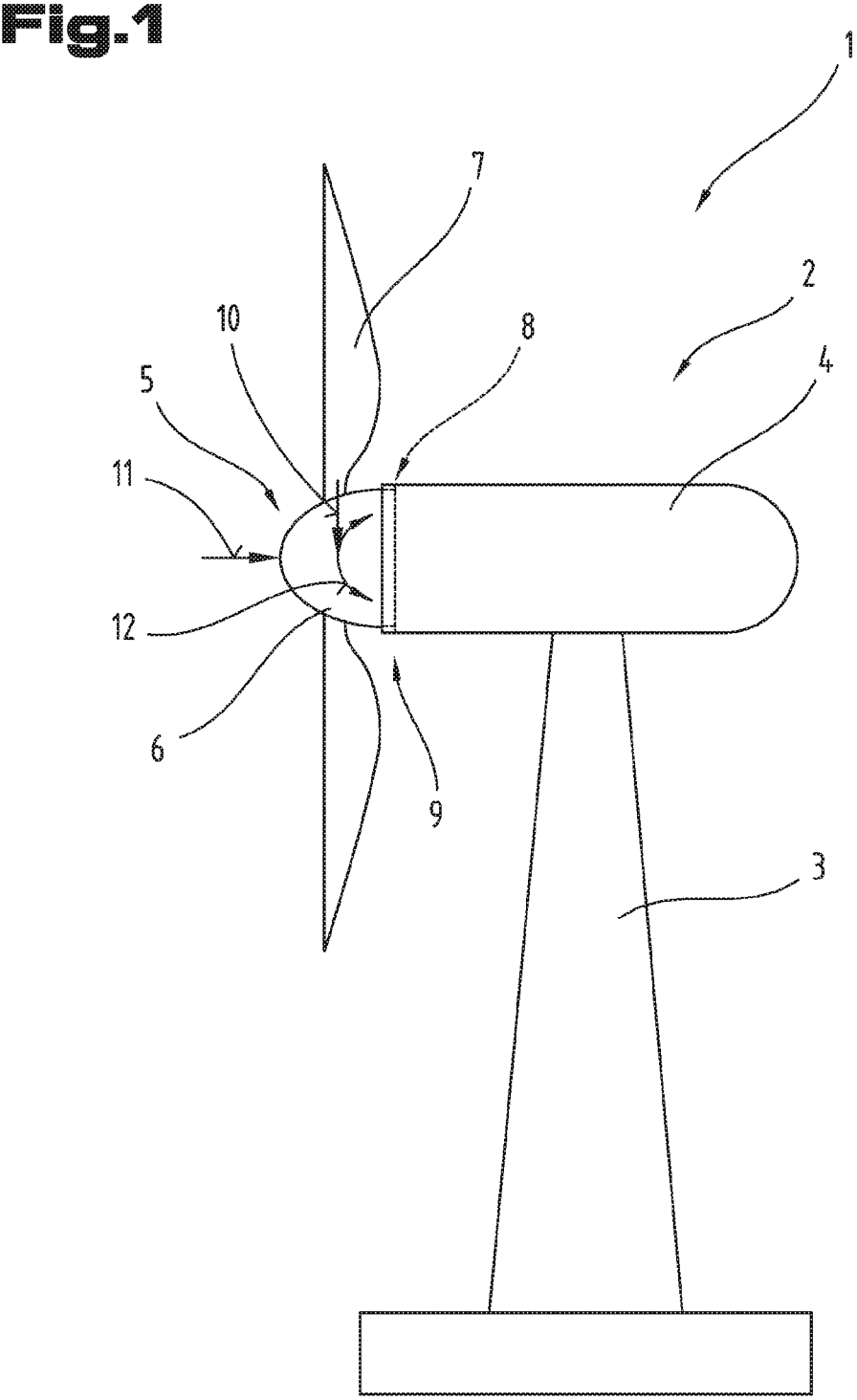

(51) Int. Cl.
*F16C 17/03* (2006.01)
*F16C 23/04* (2006.01)

(52) U.S. Cl.
CPC ........ *F16C 23/045* (2013.01); *F05B 2240/50* (2013.01); *F16C 2300/14* (2013.01); *F16C 2360/31* (2013.01)

(56) References Cited

U.S. PATENT DOCUMENTS

| | | | |
|---|---|---|---|
| 2,898,164 | A | 8/1959 | Patton |
| 5,125,754 | A | 6/1992 | Ide |
| 8,827,561 | B2 * | 9/2014 | Lagerweij ............... F03D 80/70 384/126 |
| 9,353,788 | B1 | 5/2016 | Tulett et al. |
| 9,422,984 | B2 * | 8/2016 | Pedersen ................. F16C 43/04 |
| 9,458,880 | B2 | 10/2016 | Kari et al. |
| 9,618,036 | B2 | 4/2017 | Nishioka |
| 10,072,704 | B2 | 9/2018 | Sato et al. |
| 10,260,484 | B2 | 4/2019 | Eriksen et al. |
| 10,598,214 | B2 | 3/2020 | Hoelzl |
| 11,486,446 | B2 * | 11/2022 | Hoelzl .................... F16C 17/02 |
| 2002/0051586 | A1 | 5/2002 | Orndorff, Jr. et al. |
| 2014/0169952 | A1 | 6/2014 | Pedersen et al. |
| 2014/0377063 | A1 | 12/2014 | Guerenbourg et al. |
| 2017/0260970 | A1 | 9/2017 | Stiesdal |
| 2022/0145862 | A1 * | 5/2022 | Holzinger ............... F03D 80/70 |

FOREIGN PATENT DOCUMENTS

| | | | |
|---|---|---|---|
| CN | 106170633 | A | 11/2016 |
| CN | 107448365 | A | 12/2017 |
| DE | 26807 | C | 8/1883 |
| DE | 531749 | C | 8/1931 |
| DE | 650737 | C | 9/1937 |
| DE | 678930 | C | 7/1939 |
| DE | 826807 | C | 1/1952 |
| DE | 1625538 | A1 | 3/1972 |
| EP | 2 816 226 | A1 | 12/2014 |
| EP | 2 863 076 | A1 | 4/2015 |
| EP | 3 219 984 | A1 | 9/2017 |
| EP | 3 276 192 | A1 | 1/2018 |
| EP | 3 252 306 | B1 | 12/2018 |
| FR | 1464065 | A | 7/1966 |
| GB | 387196 | A | 2/1933 |
| GB | 396808 | A | 8/1933 |
| JP | H09-303382 | A | 11/1997 |
| WO | 2011/127510 | A1 | 10/2011 |
| WO | 2017/034787 | A1 | 3/2017 |
| WO | WO-2017144058 | A1 * | 8/2017 ............ F03D 80/70 |

OTHER PUBLICATIONS

International Search Report in PCT/AT2020/060064, mailed Jul. 14, 2020.

* cited by examiner

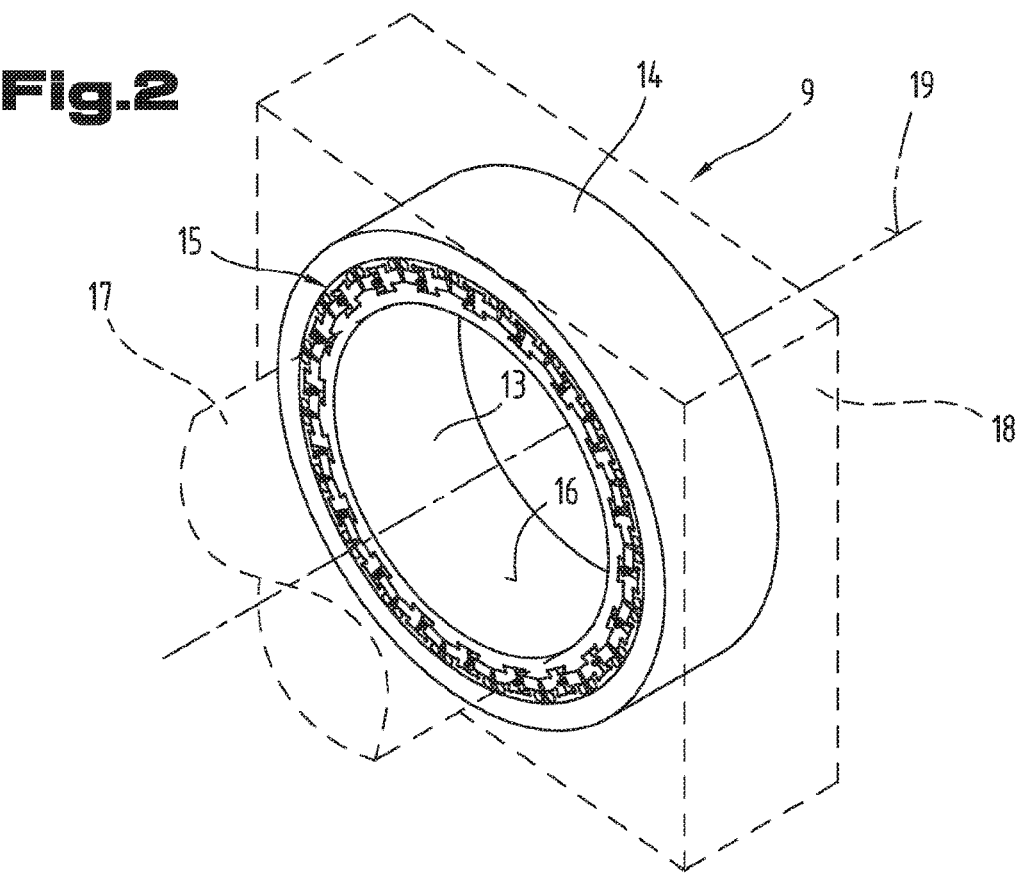
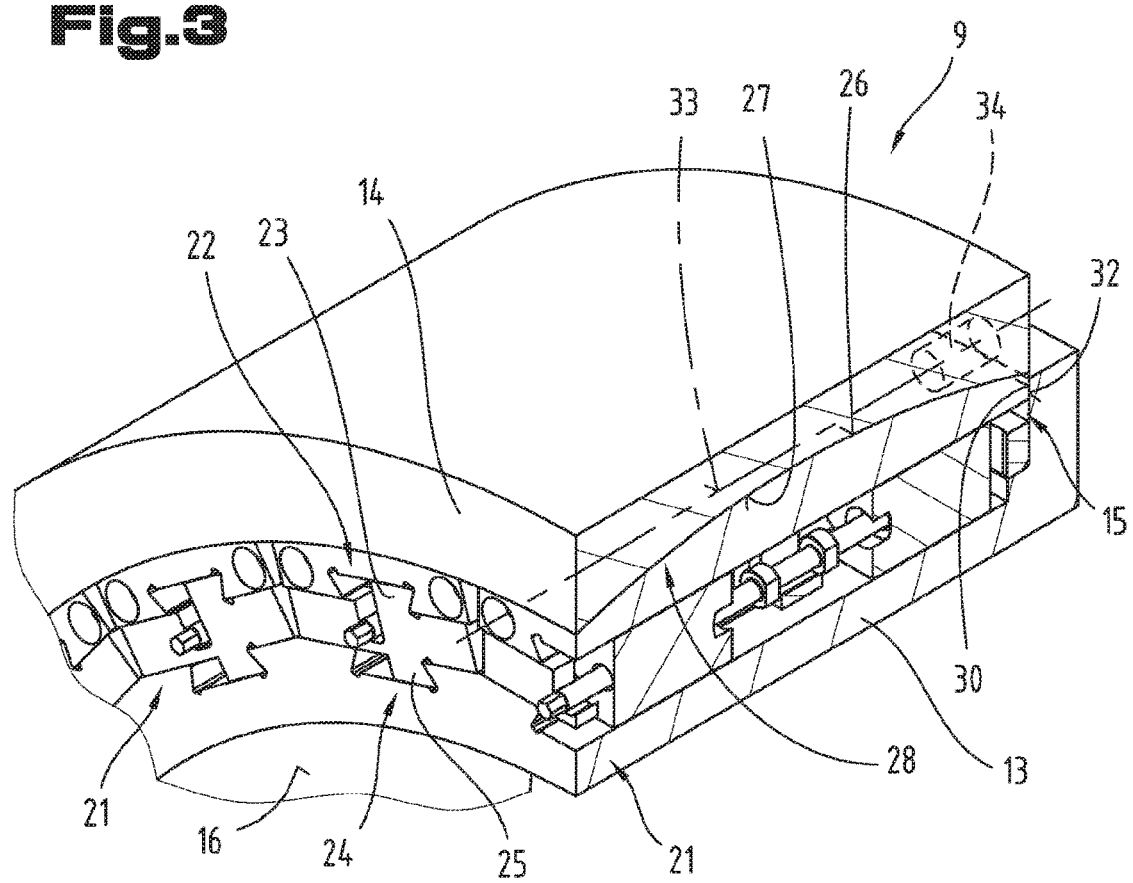

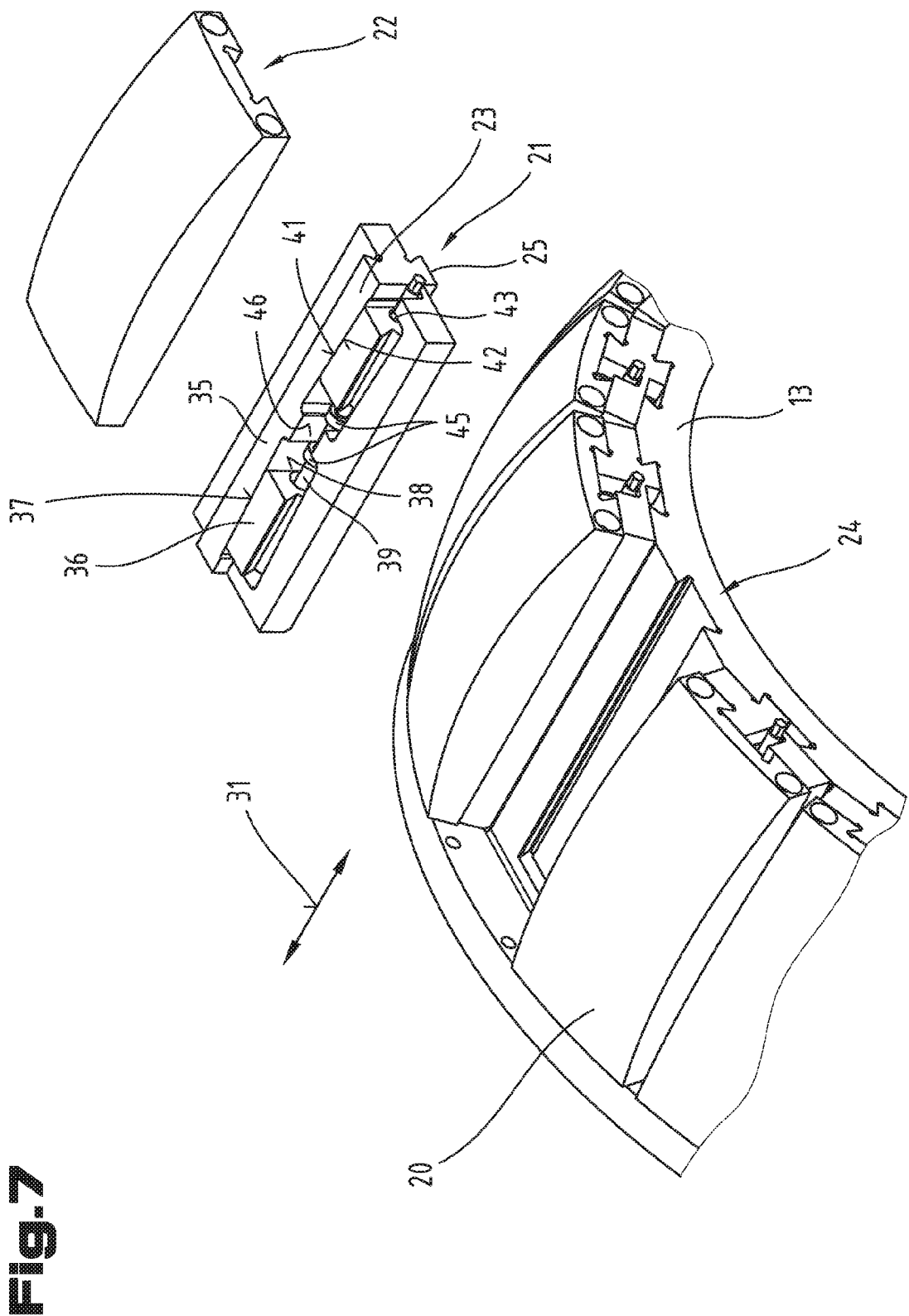

PLAIN BEARING ARRANGEMENT

CROSS REFERENCE TO RELATED APPLICATIONS

This application is the National Stage of PCT/AT2020/060064 filed on Mar. 4, 2020, which claims priority under 35 U.S.C. § 119 of Austrian Application No. A50183/2019 filed on Mar. 7, 2019, the disclosure of which is incorporated by reference. The international application under PCT article 21(2) was not published in English.

The invention relates to a sliding bearing as well as a nacelle for a wind turbine equipped with the sliding bearing as well as a method for changing sliding bearing pads in the sliding bearing.

A bearing element for bearing the rotor hub of a wind turbine is known from WO 2011/127510 A1.

The object of the present invention was to provide an improved sliding bearing.

This object is achieved by means of a device and a method according to the claims.

According to the invention, a sliding bearing is provided. The sliding bearing comprises:
- an inner ring element;
- an outer ring element;
- at least one sliding bearing element, which is arranged between the inner ring element and the outer ring element.

The sliding bearing element has multiple sliding bearing pads, wherein the individual sliding bearing pads each have a bearing surface, which is designed in the shape of a spherical cap.

The sliding bearing has the advantage that the individual sliding bearing pads can be easily connected to the inner ring element, and thus a simple installation and/or a simple replacement of the individual sliding bearing pads can be achieved. Moreover, the sliding bearing according to the invention has the surprising advantage that by means of the embodiment of a spherical cap according to the invention, bending of the rotor shaft can be compensated in the sliding bearing without an increased area load occurring at the bearing surface in the process.

Furthermore, it may be useful if the individual sliding bearing pads each have a fastening profile opposite the bearing surface, and that the inner ring element has at least one receiving profile on its radial outside, which receiving profile serves for a positive locking connection between the sliding bearing pads and the inner ring element. By these measures, a simple replaceability of the sliding bearing pads can be achieved, and at the same time, a tight fit of the sliding bearing pads can be achieved in the operational condition of the sliding bearing.

Furthermore, it may be provided that a fastening device is formed, which is arranged between the sliding bearing pad and the inner ring element, wherein the fastening device is coupled to the fastening profile and the receiving profile.

By means of the fastening device, the individual sliding bearing pads can be fastened to the inner ring element. Additionally, the fastening device serves the purpose that the individual sliding bearing pads can be easily installed in the sliding bearing and/or be removed from the sliding bearing. In particular, it can be achieved by means of the fastening device that upon removal and/or installation of the sliding bearing pads, they can be inserted between the inner ring element and the outer ring element. In this process, the outer ring element does not have to be designed to be parted.

Moreover, it may be provided that the fastening device has a first profile element, which is coupled to the fastening profile, and has a second profile element on the opposite side, which is coupled to the receiving profile. By these measures, the fastening device can be coupled both with the sliding bearing pad and with the inner ring element, whereby the sliding bearing pad can be fastened to the inner ring element by means of the fastening device.

An embodiment, according to which it may be provided that the fastening profile and the first profile element are formed as a dovetail connection and/or that the receiving profile and the second profile element are formed as a dovetail connection, is also advantageous. A dovetail connection in particular is well-suited for establishing a positive locking connection between the inner ring element and the fastening device and/or between the sliding bearing pad and the fastening device.

According to an advancement, it is possible that the fastening device comprises a main body and at least a first clamping wedge, which has a wedge surface, which cooperates with a first counter wedge surface formed in the main body and tapering in the axial direction, wherein the first clamping wedge can be displaced in the axial direction relative to the main body by means of a first positioning means, in particular a thread element. A clamping wedge formed like this, in particular, is surprisingly suitable for establishing a connection, which can transfer high forces, and which is easily releasable.

Furthermore, it may be useful if the fastening device comprises a second clamping wedge, which has a wedge surface, which cooperates with a second counter wedge surface formed in the main body and tapering in the axial direction, wherein the first counter wedge surface and the second counter wedge surface are formed to taper in opposite directions, wherein the second clamping wedge can be displaced in the axial direction by means of a second positioning means, in particular a thread element. By using a second clamping wedge, a symmetrical clamping of the sliding bearing pad can be achieved.

Moreover, it may be provided that the first positioning means, and the second positioning means are formed on a common positioning rod, wherein the first positioning means has a right-handed thread and the second positioning means has a left-handed thread. This entails the advantage that by rotating the common positioning rod, both clamping wedges can be opened and/or closed. For this function, it is essential that on the first positioning means and on the second positioning means, an opposing thread is formed. However, for everyday use, it is useful in the described configuration that the first positioning means is a right-handed thread, so that by a clockwise rotation, the clamping can be closed, and by a counterclockwise rotation, the clamping can be opened.

Furthermore, it may be provided that the first clamping wedge and/or the second clamping wedge is formed such that it extends into the fastening profile and into the receiving profile. This entails the advantage that by displacing the first clamping wedge and/or the second clamping wedge, the fastening device can be clamped both in the fastening profile and in the receiving profile. Thus, the sliding bearing pad can be tightly clamped on the inner ring element with just one actuation movement.

According to a particular embodiment, it is possible that an axial stop for the sliding bearing pad is formed on the inner ring element in the region of the receiving profile. This entails the advantage that the sliding bearing pad can be exactly positioned in the axial direction.

According to an advantageous advancement, it may be provided that a fastening element is provided, by means of which the sliding bearing pad is pressed against the axial stop in the axial direction. This entails the advantage, that the sliding bearing pad can be fixed and/or correctly positioned in the axial direction, in order to be able to achieve the functionality of the sliding bearing.

A spherical cap is a segment of the surface of a sphere. The bearing surface preferably has the basic shape of an ideal spherical cap. Correspondingly thereto, the counterface is of course also formed in the shape of an ideal spherical cap. The radii of these two spherical caps are correspondingly selected so that the bearing surface rests on the counterface with as much of its surface as possible. In particular applications, it may also be provided that not the entire bearing surface has the shape of an ideal spherical cap but that, for example, an oil intake wedge is formed, which may be necessary in a hydrodynamic bearing. Thus, it is possible that the bearing surface deviates from the shape of the ideal spherical cap particularly in the circumferential direction. Moreover, it is also conceivable that the surface of the bearing surface deviates from the ideal spherical cap due to production tolerances. Such embodiments also fall within the scope of protection of the independent main claims.

According to the invention, a nacelle for a wind turbine is provided. The nacelle comprises:

a nacelle housing;

a rotor hub;

a rotor bearing for bearing the rotor hub on the nacelle housing.

The rotor bearing comprises a sliding bearing according to one of the preceding claims.

In nacelles according to the invention, in particular, the sliding bearing according to the invention leads to an easy maintainability of the sliding bearing.

Moreover, a wind turbine with a nacelle described above is provided according to the invention.

According to the invention, a method for replacing sliding bearing pads in a sliding bearing as described above is provided. The method comprises the following method steps:

releasing one of the fastening devices by axially displacing the profile elements;

pulling the fastening device of the relevant sliding bearing pad axially out of the intermediate space between the inner ring element and the sliding bearing pad;

removing the sliding bearing pad by radially displacing the sliding bearing pad inwards and subsequently pulling the sliding bearing pad axially out of the inner ring element;

inserting a new sliding bearing pad by axially inserting the sliding bearing pad and subsequently displacing the sliding bearing pad radially outwards;

pushing the fastening device of the relevant sliding bearing pad axially into the intermediate space between the inner ring element and the sliding bearing pad, wherein the sliding bearing pad is coupled to the inner ring element by means of the fastening device;

fixing the sliding bearing pad by axially displacing the profile elements.

For the purpose of better understanding of the invention, it will be elucidated in more detail by means of the figures below.

Figure 4:
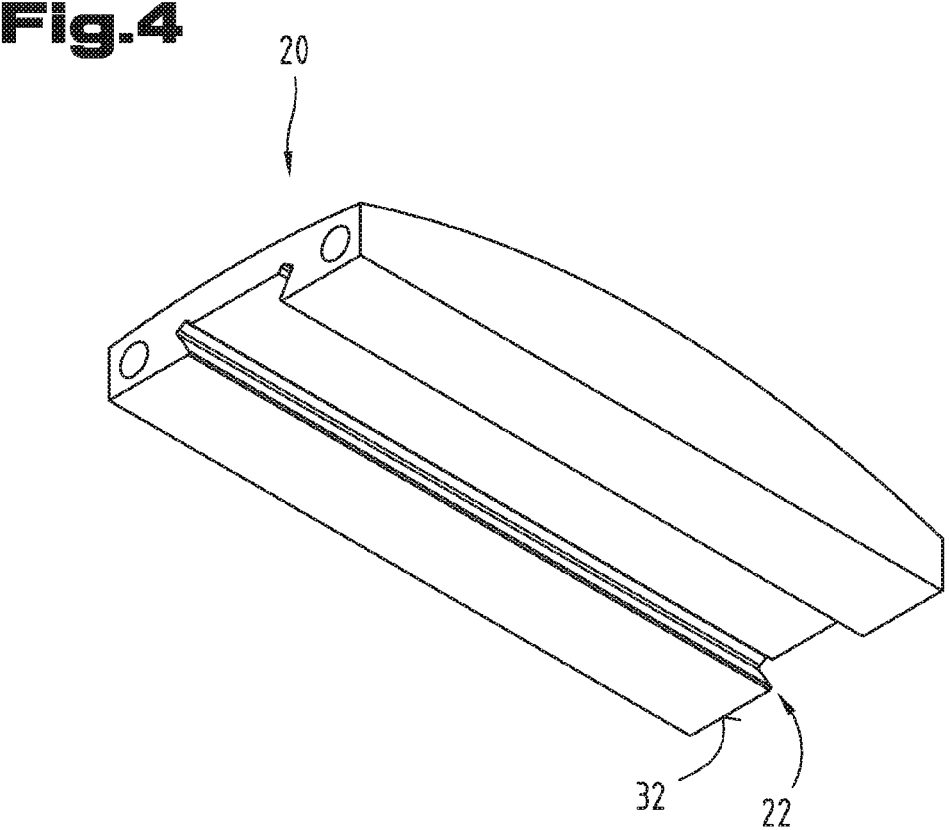
Figure 5:
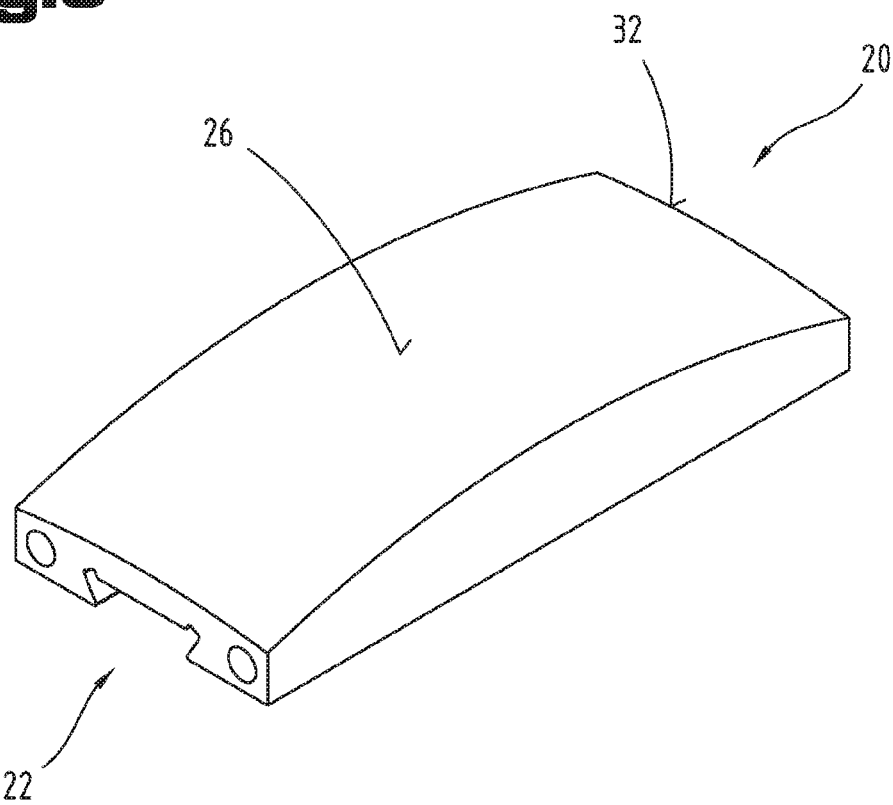
Figure 6:
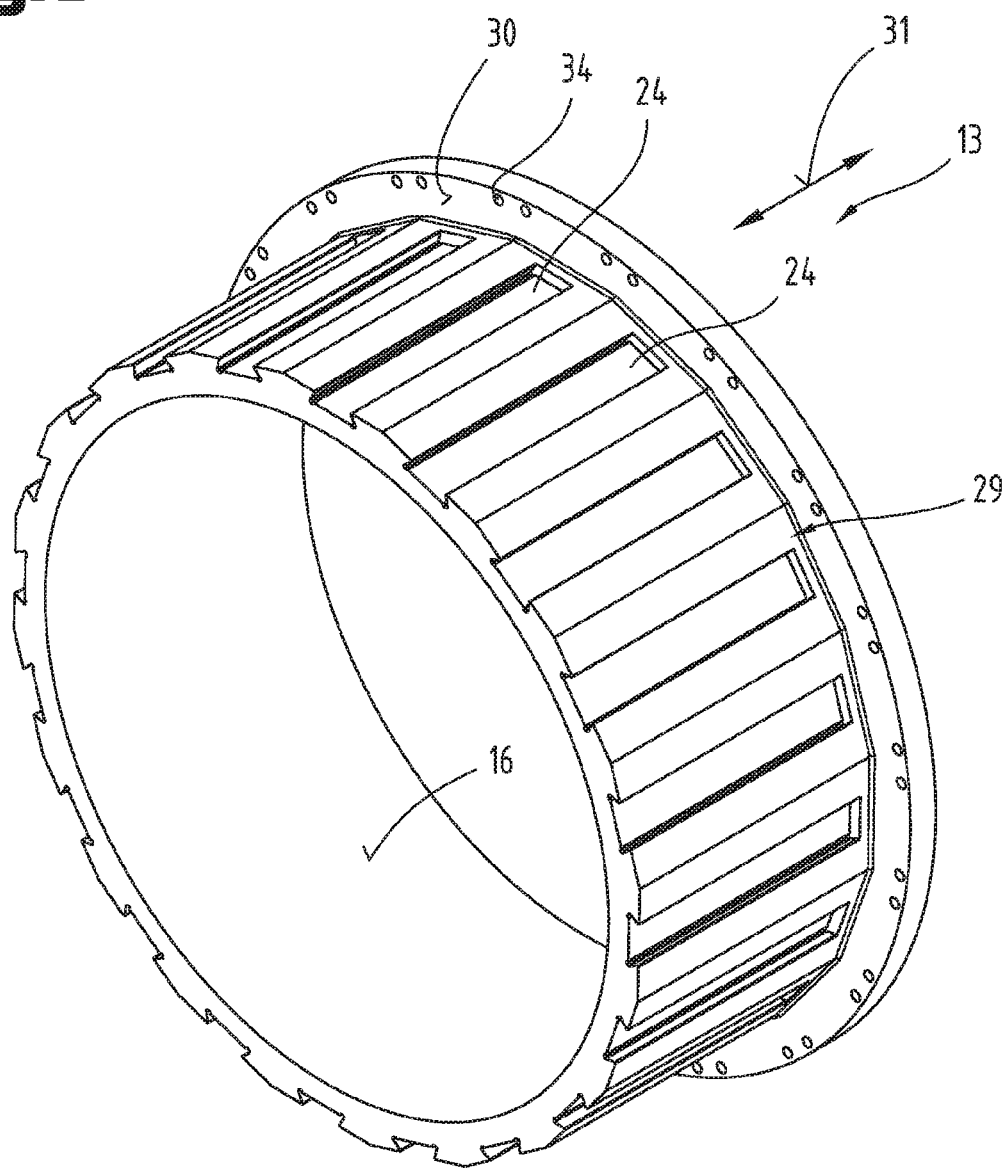

These show in a respectively very simplified schematic representation:

FIG. 1 a schematic representation of a wind turbine;

FIG. 2 a perspective view of an exemplary embodiment of a sliding bearing;

FIG. 3 a perspective sectional representation of the sliding bearing;

FIG. 4 a first perspective view of an exemplary embodiment of a sliding bearing pad;

FIG. 5 a second perspective view of the exemplary embodiment of the sliding bearing pad;

FIG. 6 a perspective view of an exemplary embodiment of an inner ring element;

FIG. 7 a perspective view of the inner ring element with sliding bearing pads arranged thereon.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

FIG. 1 shows, in a schematic view, a first exemplary embodiment of a wind turbine 1 for generating electrical energy from wind energy. The wind turbine 1 comprises a nacelle 2, which is rotatably received on a tower 3. The nacelle 2 comprises a nacelle housing 4, which forms the main structure of the nacelle 2. In the nacelle housing 4 of the nacelle 2, the electrotechnical components such as a generator of the wind turbine 1 are arranged.

Moreover, a rotor 5 is formed, which has a rotor hub 6 with rotor blades 7 arranged thereon. The rotor hub 6 is considered part of the nacelle 2. The rotor hub 6 is received so as to be rotatable on the nacelle housing 4 by means of a rotor bearing 8. In particular, it is provided that a sliding bearing 9 according to the invention and described in more detail below is used as a rotor bearing 8.

The rotor bearing 8, which serves for bearing the rotor hub 6 on the nacelle housing 4 of the nacelle 2, is configured for absorbing a radial force 10 and an axial force 11. The axial force 11 is caused by the force of the wind. The radial force 10 is caused by the weight force of the rotor 5 and is effective at the center of gravity of the rotor 5. As the center of gravity of the rotor 5 is outside the rotor bearing 8, a tilting torque 12 is generated in the rotor bearing 8 by the radial force 10. The tilting torque 12 may also be caused by an uneven load of the rotor blades 7. This tilting torque 12 can be absorbed by means of a second sliding bearing, which is arranged at a distance from the sliding bearing 9 according to the invention.

The rotor bearing 8 according to the invention can have a diameter of 0.5 m to 5 m, for example. Of course, it is also conceivable that the rotor bearing 8 is smaller or larger.

FIG. 2 shows a first exemplary embodiment of the sliding bearing 9 built into the nacelle 2. The sliding bearing 9 is shown in a perspective view in FIG. 2. Of course, the sliding bearing 9 shown in FIG. 2 may also be used in all other industrial applications outside of wind turbines.

As can be seen from FIG. 2, it may be provided that the sliding bearing 9 has an inner ring element 13 and an outer ring element 14. Between the inner ring element 13 and the outer ring element 14, a sliding bearing element 15 is arranged, which serves for the rotatory sliding bearing of the inner ring element 13 relative to the outer ring element 14.

In the exemplary embodiment shown in FIG. 2, an inner jacket surface 16 is formed on the inner ring element 13, which inner jacket surface 16 has a cylindrical shape and serves for receiving a rotor shaft 17 or any other shaft. The rotor shaft 17 is schematically shown in FIG. 2. Moreover, it may be provided that the outer ring element 14 is coupled to the nacelle housing 4 by means of a bearing mount 18. In the exemplary embodiment shown in FIG. 2, it is therefore provided that the outer ring element 14 is rigidly coupled to the nacelle housing 4, and the inner ring element 13 is rotatable with respect to a rotor axis 19 relative to the outer ring element 14 by means of the sliding bearing element 15. As the rotor shaft 17, which is coupled to the rotor hub 6 and thus to the rotor 5, is received in the inner ring element 13, the rotor shaft 17 is therefore rotatably received in the nacelle housing 4 by means of the sliding bearing 9.

In FIG. 3, the sliding bearing 9 is shown in a perspective cross-sectional view. As can be seen in FIG. 3, the sliding bearing element 15 comprises multiple individual sliding bearing pads 20, which are arranged distributed across the circumference, between the inner ring element 13 and the outer ring element 14.

The individual sliding bearing pads 20 are each coupled to the inner ring element 13 by means of a fastening device 21. In particular, it is provided that the fastening device 21 is arranged between the sliding bearing pad 20 and the inner ring element 13. The fastening device 21 itself is arranged on the inner ring element 13 and serves as a carrier for the individual sliding bearing pads 20.

The sliding bearing pad 20 has a fastening profile 22, which is coupled to a first profile element 23 of the fastening device 21.

Furthermore, a receiving profile 24 is formed in the inner ring element 13, which receiving profile 24 is coupled to a second profile element 25 of the fastening device 21.

As can be seen particularly well in FIG. 3, the connection between the fastening profile 22 and the first profile element 23 of the fastening device 21 is designed as a dovetail connection. Hence, the first profile element 23 can be inserted axially into the fastening profile 22.

Analogously thereto, the receiving profile 24 and the second profile element 25 of the fastening device 21 are also designed as dovetail connections. Hence, the second profile element 25 can be inserted axially into the receiving profile 24.

Hence, the sliding bearing pads 20 are releasably received on the inner ring element 13 by means of the fastening device 21.

The individual sliding bearing pads 20 are in each case shown in a perspective view in FIGS. 4 and 5. The further structure of the sliding bearing 9, in particular of the sliding bearing pads 20, is carried out with a combination of FIGS. 3, 4 and 5.

As can be seen in FIGS. 3, 4 and 5, it may be provided that the fastening profile 22 and/or the receiving profile 24 is formed as a groove of the dovetail connection. Correspondingly thereto, the first profile element 23 and the second profile element 25 of the fastening device 21 may be designed as a tongue.

As an alternative to this, it is of course also conceivable that the first profile element 23 and the second profile element 25 of the fastening device 21 are formed as a groove, and the fastening profile 22 and/or the receiving profile 24 are formed as a tongue.

Thus, the individual fastening devices 21 can be inserted, in the axial direction of the rotor axis 19, into the receiving profile 24 of the inner ring element 13 and/or into the fastening profile 22 of the sliding bearing pad 20, and/or be removed therefrom. This serves to simply replace and/or to simply install the individual sliding bearing pads 20. Moreover, the dovetail connection allows achieving that the individual sliding bearing pads 20 are connected well to the inner ring element 13 due to the positive locking dovetail connection.

In the operating state of the sliding bearing 9, the individual sliding bearing pads 20 are thus fixedly connected to the inner ring element 13 due to the structure described and thus, rotate along with it relative to the outer ring element 14. In order to enable the rotational movement between the inner ring element 13 and the outer ring element 14, on each of the individual sliding bearing pads 20 one bearing surface 26 is formed opposite the fastening profile 22, which bearing surface 26 abuts on a counterface 27 of the outer ring element 14 in the operational state of the sliding bearing 9. The counterface 27 is arranged on the inside 28 of the outer ring element 14. The bearing surface 26 of the sliding bearing pad 20 and the counterface 27 of the outer ring element 14 are designed as sliding surfaces, which slide on one another during operation of the sliding bearing 9. In particular, it may be provided that the counterface 27 of the outer ring element 14 is designed as a hard, wear-resistant surface, which may be formed, for example, by a hardened steel. The bearing surface 26 of the sliding bearing pad 20 may be formed of a sliding bearing material which is soft in comparison to the counterface 27. Of course, it is also conceivable that the bearing surface 26 has an anti-friction coating.

As can be seen particularly well in FIG. 3, the bearing surface 26 is designed in the shape of a spherical cap. Designing the bearing surface 26 and/or the counterface 27 in the shape of a spherical cap entails the advantage that the sliding bearing pads 20 can be rotated easily about the rotor axis 19. At the same time, the sliding bearing pads 20 can be tilted about an angle with respect to the longitudinal extension of the rotor axis 19. By means of the described embodiment of a spherical cap, bending of the rotor shaft 17 can thus be compensated in the sliding bearing 9 without an increased area load occurring on the bearing surface 26 in the process.

Moreover, due to the design of the bearing surface 26 and/or the counterface 27 in the shape of a spherical cap, axial bearing forces can also be transferred in addition to the transfer of radial bearing forces.

FIG. 6 shows a perspective view of the inner ring element 13. As can be seen from a combination of FIGS. 3 to 6, the individual receiving profiles 24 are arranged on an outside 29 of the inner ring element 13. In particular, it is provided that the individual receiving profiles 24 are arranged on the inner ring element 13 so as to be evenly distributed across the circumference. Hence, each receiving profile 24 serves to receive a sliding bearing pad 20.

As can be seen particularly well in FIG. 6, it may be provided that an axial stop 30 is formed on the outside 29 of the inner ring element 13, which axial stop 30 serves to position the sliding bearing pad 20 in the axial direction 31. The axial stop 30 can be designed as an offset, as can be seen in FIG. 6.

Furthermore, it may be provided that a front side 32 of the sliding bearing pad 20 abuts on the axial stop 30 in the installed state of the sliding bearing pad 20. Thereby, the sliding bearing pad 20 can be positioned axially.

Furthermore, it may be provided, as can be seen particularly well in FIG. 3, that the sliding bearing pad 20 is pressed against the axial stop in the axial direction 31 by means of a fastening element 33, such as a screw, in particular a stress bolt. The fastening element 33 may be screwed into a thread hole 34, which is formed in the axial stop 30.

FIG. 7 shows a perspective view of the inner ring element 13 including the sliding bearing pads 20 arranged thereon. For better representation of the functioning of the connection between the individual sliding bearing pads 20 and the inner ring element 13, one of the sliding bearing pads 20 is pushed to the side.

As can be seen in FIG. 7, it may be provided that the fastening device 21 serves to fix the sliding bearing pad 20 in the inner ring element 13. The fastening device 21 may act, in particular, between the fastening profile 22 of the sliding bearing pad 20 and the receiving profile 24 of the inner ring element 13 and/or be arranged between these two elements.

As can further be seen in FIG. 7, it may be provided that the fastening device 21 comprises at least a first clamping wedge 36, which has a wedge surface 37. In a main body 35 of the fastening device 21, a counter wedge surface 38 is formed, which tapers in the axial direction 31 and which cooperates with the wedge surface 37. Furthermore, a first positioning means 39 is provided, by means of which the first clamping wedge 36 can be displaced in the axial direction 31. The first clamping wedge 36 may extend into the first profile element 23 and also into the second profile element 25. In particular, the dovetail tongue of the first profile element 23 may be formed by the main body 35 in combination with the first clamping wedge 36. Analogously to this, the dovetail tongue of the second profile element 25 may be formed by the main body 35 in combination with the first clamping wedge 36.

By displacing the first clamping wedge 36 relative to the main body 35 in the axial direction 31, the dovetail tongue of the first profile element 23 and/or the dovetail tongue of the second profile element 25 can be increased and/or decreased in size. This allows achieving a clamping of the first profile element 23 in the fastening profile 22 and/or a clamping of the second profile element 25 in the receiving profile 24.

Analogously to this, it may be provided that the fastening device 21 comprises a second clamping wedge 40, which also has a wedge surface 41. The wedge surface 41 may cooperate with a second counter wedge surface 42 formed in the main body 35 and tapering in the axial direction 31. The first counter wedge surface 38 and the second counter wedge surface 42 are formed to taper in opposite directions. The second clamping wedge 40 can be displaced in the axial direction 31 by means of a second positioning means 43. In particular, it may be provided that the first positioning means 39 and the second positioning means 43 are formed on a common positioning rod 44. Furthermore, it may be provided that the positioning rod 44 has an axial guide 45, which is received in the positioning rod receptacle 46. The positioning rod receptacle 46 may be formed in the main body 35. The axial guide 45 may be designed, for example, as a drum.

In particular, it may be provided that the first positioning means 39 has a left-handed thread and the second positioning means 43 has a right-handed thread, so that, when rotating the positioning rod 44 in a first direction, the two clamping wedges 36, 40 are removed from one another, and when rotating the positioning rod 44 in a second direction of rotation, the two clamping wedges 36, 40 are moved towards one another. Thus, the clamping can be opened and/or closed by rotating the positioning rod 44. Of course, the left-handed thread and the right-handed thread may also be switched.

As is evident from the description above, the second clamping wedge 40 therefore has a function analogous to that of the first clamping wedge 36, and also forms the dovetail tongue of the first profile element 23 and/or the dovetail tongue of the second profile element 25 together with the main body 35.

An assembly of the sliding bearing 9 is described with the aid of FIGS. 3 and 7.

In a first method step, the outer ring element 14 is fixed on its installation site, for example in the nacelle housing 4. Subsequently, a shaft, for example the rotor shaft 17, along with the inner ring element 13 arranged thereon is inserted in the axial direction into the outer ring element 14, wherein the individual sliding bearing pads 20 are not yet arranged on the inner ring element 13 during this procedure.

Subsequently, the inner ring element 13 is coaxially oriented relative to the outer ring element 14 in the axial position and also in the radial position.

Subsequently, the sliding bearing pad 20 can be inserted in the axial direction 31 between the inner ring element 13 and the outer ring element 14. Subsequently, the sliding bearing pad 20 is displaced outward in the radial direction, so that the bearing surface 26 of the sliding bearing pad 20 abuts on the counterface 27. In this regard, the sliding bearing pad 20 is spaced apart from the inner ring element 13, which results in a free space.

In a subsequent method step, the fastening device 21 is inserted in the axial direction 31 in the free space between the sliding bearing pad 20 and the inner ring element 14. In this process, the first profile element 23 of the fastening device 21 is inserted into the fastening profile 22 of the sliding bearing pad 20, and simultaneously, the second profile element 25 of the fastening device 21 is inserted into the receiving profile 24 of the inner ring element 13.

When positioning the fastening device 21 in the fastening profile 22 and/or in the receiving profile 24, the first clamping wedge 36 and the second clamping wedge 40 are arranged in the fastening device 21 space apart from one another at such a distance that the first profile element 23 of the fastening device 21 can be inserted smoothly into the fastening profile 22 of the sliding bearing pad 20, and the second profile element 25 of the fastening device 21 can be inserted smoothly into the receiving profile 24 of the inner ring element 13.

The sliding bearing pad 20 and also the fastening device 21 are pushed onto the inner ring element 13 in the axial direction 31 until they abut on the axial stop 30 and thus are positioned in the axial direction 31. Thereby, the axial position of the sliding bearing pad 20 is defined.

Subsequently, the fastening element 33 can be screwed into the thread hole 34 in order to secure the sliding bearing pad 20 in its axial position.

Subsequently, the positioning rod 31 can be rotated in the screwing-in direction, so that the two clamping wedges 36, 40 are pulled toward one another. By this movement of the two clamping wedges 36, 40 or by the wedge surfaces 37, 41, the first profile element 23 is clamped in the fastening profile 22 of the sliding bearing pads 20, and the second profile element 25 is clamped in the receiving profile 24 by means of the clamping wedges 36, 40. Hence, the sliding bearing pad 20 is fixed on the inner ring element 13 by means of the fastening device 21.

Optionally, the fastening element 33 can then be retightened.

Alternatively, it is of course also possible to first apply the fastening device 21 and only afterwards apply the fastening element 33.

Subsequently, the inner ring element 13 is rotated about an angle along with the shaft, so that the next sliding bearing pad 20 can be coupled to the inner ring element 13 in the manner described above. The processes described above are repeated until a sliding bearing pad 20 is received in all receiving profiles 24 of the inner ring element 13.

After completing the installation, a mount and/or bearing of the shaft necessary for installation can be removed, so that the shaft is supported in the bearing mount 18 by means of the sliding bearing 9 and is therefore operational.

For replacing the individual sliding bearing pads 20, it is not necessary that the load of the shaft is absorbed by an external bearing, but it may be provided that only one individual sliding bearing pad 20 at a time is replaced by a new sliding bearing pad 20, wherein this procedure is repeated until all sliding bearing pads 20 are replaced. In this process, the fastening device 21 can be released, and after removing the fastening device 21, the free sliding bearing pad 20 can be pulled out of the inner ring element 13 in the axial direction 31.

Subsequently, a new sliding bearing pad 20 may be placed in the position of the old sliding bearing pad 20 according to the description above. Subsequently, the newly inserted sliding bearing pad 20 can be fixed, and subsequently, the inner ring element 13 can be rotated so that the next sliding bearing pad can be replaced according to the steps described above. This procedure may be repeated until all sliding bearing pads 20 are replaced.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

LIST OF REFERENCE NUMBERS

| 1  | Wind turbine |
|----|--------------|
| 2  | Nacelle |
| 3  | Tower |
| 4  | Nacelle housing |
| 5  | Rotor |
| 6  | Rotor hub |
| 7  | Rotor blade |
| 8  | Rotor bearing |
| 9  | Sliding bearing |
| 10 | Radial force |
| 11 | Axial force |
| 12 | Tilting torque |
| 13 | Inner ring element |
| 14 | Outer ring element |
| 15 | Sliding bearing element |
| 16 | Inner jacket surface of the inner ring element |
| 17 | Rotor shaft |
| 18 | Bearing mount |
| 19 | Rotor axis |
| 20 | Sliding bearing pad |
| 21 | Fastening device |
| 22 | Fastening profile |
| 23 | First profile element |
| 24 | Receiving profile |
| 25 | Second profile element |
| 26 | Bearing surface |
| 27 | Counterface |
| 28 | Inside |
| 29 | Outside |
| 30 | Axial stop |
| 31 | Axial direction |
| 32 | Front side of the sliding bearing pad |
| 33 | Fastening element |
| 34 | Thread hole |
| 35 | Main body |
| 36 | First clamping wedge |
| 37 | Wedge surface of the first clamping wedge |
| 38 | First counter wedge surface |
| 39 | First positioning means |
| 40 | Second clamping wedge |
| 41 | Wedge surface of the second clamping wedge |
| 42 | Second counter wedge surface |
| 43 | Second positioning means |
| 44 | Positioning rod |
| 45 | Axial guide |
| 46 | Positioning rod receptacle |

The invention claimed is:

1. A sliding bearing comprising:
an inner ring element;
an outer ring element; and
at least one sliding bearing element, which is arranged between the inner ring element and the outer ring element;
wherein the at least one sliding bearing element has multiple sliding bearing pads;
wherein the individual sliding bearing pads each have a bearing surface, which is formed in the shape of a spherical cap;
wherein the individual sliding bearing pads each have a fastening profile opposite the bearing surface, and wherein the inner ring element has receiving profiles on a radial outside of the inner ring element, wherein the receiving profiles serve as a positive locking connection between the sliding bearing pads and the inner ring element;
a fastener arranged between each sliding bearing pad and the inner ring element, wherein each fastener is coupled to the respective fastening profile and the respective receiving profile; and
wherein each fastener comprises: a main body and at least a first clamping wedge, which has a wedge surface, which cooperates with a first counter wedge surface formed in the main body and tapering in an axial direction, wherein the first clamping wedge can be displaced in the axial direction relative to the main body by a first positioning means comprising a thread element.

2. The sliding bearing according to claim 1, wherein each fastener has a first profile element, which is coupled to the respective fastening profile on a first side, and has a second profile element on a second side, which is coupled to the respective receiving profile.

3. The sliding bearing according to claim 2, wherein each fastening profile and the respective first profile element are formed as a dovetail connection and/or wherein each receiving profile and the respective second profile element are formed as a dovetail connection.

4. The sliding bearing according to claim 1, wherein each fastener comprises: a second clamping wedge, which has a wedge surface, which cooperates with a second counter wedge surface formed in the main body and tapering in the axial direction, wherein the first counter wedge surface and the second counter wedge surface are formed to taper in opposite directions, wherein the second clamping wedge can be displaced in the axial direction by a second positioning means comprising a thread element.

5. The sliding bearing according to claim 4, wherein the first positioning means and the second positioning means are formed on a common positioning rod, wherein the first positioning means has a right-handed thread and the second positioning means has a left-handed thread.

6. The sliding bearing according to claim 4, wherein the first clamping wedge and/or the second clamping wedge extends into the respective fastening profile and into the respective receiving profile.

7. The sliding bearing according to claim 1, wherein an axial stop for each sliding bearing pad is formed on the inner ring element in the region of the respective receiving profile.

8. The sliding bearing according to claim 7, further comprising a fastening element configured to press each sliding bearing pad against the respective axial stop in the axial direction.

9. A method for replacing a sliding bearing pad in the sliding bearing according to claim 2, comprising the method steps:
    releasing one of the fasteners by axially displacing the first and second profile elements;
    pulling the one of the fasteners of the relevant sliding bearing pad axially out of an intermediate space between the inner ring element and the relevant sliding bearing pad;
    removing the relevant sliding bearing pad by radially displacing the relevant sliding bearing pad inwards and subsequently pulling the relevant sliding bearing pad axially out of the inner ring element;
    inserting a new sliding bearing pad by axially inserting the new sliding bearing pad and subsequently displacing the new sliding bearing pad radially outwards;
    pushing the one of the fasteners axially into the intermediate space, wherein the new sliding bearing pad is coupled to the inner ring element by the one of the fasteners; and
    fixing the new sliding bearing pad by axially displacing the first and second profile elements.

10. A nacelle for a wind turbine, the nacelle comprising:
    a nacelle housing;
    a rotor hub; and
    a rotor bearing for bearing the rotor hub on the nacelle housing;
    wherein the rotor bearing comprises a sliding bearing comprising:
    an inner ring element;
    an outer ring element comprising a counterface being a hard, wear-resistant surface; and
    at least one sliding bearing element, which is arranged between the inner ring element and the outer ring element;
    wherein the at least one sliding bearing element has multiple sliding bearing pads;
    wherein the individual sliding bearing pads each have a bearing surface, which is formed in the shape of a spherical cap, wherein the bearing surface of each sliding bearing pad and the counterface of the outer ring element slide on one another during rotation of the rotor hub; and
    wherein the bearing surface of each sliding bearing pad is formed of a sliding bearing material which is soft in comparison to the counterface.

11. A wind turbine having a nacelle, the nacelle comprising:
    a nacelle housing; and
    a rotor hub with rotor blades arranged thereon;
    a rotor bearing for bearing the rotor hub on the nacelle housing;
    wherein the rotor bearing comprises a sliding bearing comprising:
    an inner ring element;
    an outer ring element comprising a counterface being a hard, wear-resistant surface; and
    at least one sliding bearing element, which is arranged between the inner ring element and the outer ring element;
    wherein the at least one sliding bearing element has multiple sliding bearing pads;
    wherein the individual sliding bearing pads each have a bearing surface, which is formed in the shape of a spherical cap, wherein the bearing surface of each sliding bearing pad and the counterface of the outer ring element slide on one another during rotation of the rotor hub; and
    wherein the bearing surface of each sliding bearing pad is formed of a sliding bearing material which is soft in comparison to the counterface.

12. A sliding bearing comprising:
    an inner ring element;
    an outer ring element; and
    at least one sliding bearing element, which is arranged between the Inner ring element and the outer ring element;
    wherein the at least one sliding bearing element has multiple sliding bearing pads;
    wherein the individual sliding bearing pads each have a bearing surface, which is formed in the shape of a spherical cap; and
    wherein the individual sliding bearing pads each have a fastening profile opposite the bearing surface, and wherein the inner ring element has receiving profiles on a radial outside of the inner ring element, wherein the receiving profiles serve as a positive locking connection between the sliding bearing pads and the inner ring element;
    a fastener arranged between each sliding bearing pad and the inner ring element, wherein each fastener is coupled to the respective fastening profile and the respective receiving profile;
    wherein each fastener has a first profile element, which is coupled to the respective fastening profile on a first side, and has a second profile element on a second side, which is coupled to the respective receiving profile; and
    wherein each fastening profile and the respective first profile element are formed as a dovetail connection and/or wherein each receiving profile and the respective second profile element are formed as a dovetail connection.

\* \* \* \* \*